M. VON UNSCHULD-LAZARD.
ART OF AND MEANS FOR PIANO TECHNIC INSTRUCTION.
APPLICATION FILED DEC. 24, 1912.

1,133,074.

Patented Mar. 23, 1915.

UNITED STATES PATENT OFFICE.

MARIE von UNSCHULD-LAZARD, OF WASHINGTON, DISTRICT OF COLUMBIA.

ART OF AND MEANS FOR PIANO-TECHNIC INSTRUCTION.

1,133,074. Specification of Letters Patent. Patented Mar. 23, 1915.

Application filed December 24, 1912. Serial No. 738,505.

*To all whom it may concern:*

Be it known that I, MARIE VON UNSCHULD-LAZARD, citizen of the United States, residing at Washington, in the District of Columbia, have invented certain new and useful Improvements in the Art of and Means for Piano-Technic Instruction; and I do hereby declare the following to be a full, clear, and exact description of the invention, such as will enable others skilled in the art to which it appertains to make and use the same.

This invention relates to the art of piano playing, and is particularly concerned with the technic thereof, and the means for properly acquiring the same.

The present invention has in view the provision of a novel method and means for imparting to the student, by self-instruction, the proper conception of piano technic through the portrayal in animated form of the positions of the hands and fingers simultaneously with the display in musical notation of the finger movements, whereby the student is enabled to determine accurately the proper positions to be assumed.

It will be apparent from the subjoined description that the method and means are applicable generally to the delineation of all of the movements, but it is deemed unnecessary to select more than one of these for an understanding of the invention, in the light of which the disclosure will be confined to the application of the invention to the chromatic scale.

With the foregoing in view the invention consists substantially in the novel construction, combination and arrangement of parts, and the novel method, hereinafter fully described, illustrated in the accompanying drawings, and pointed out in the appended claims.

Figure 1:
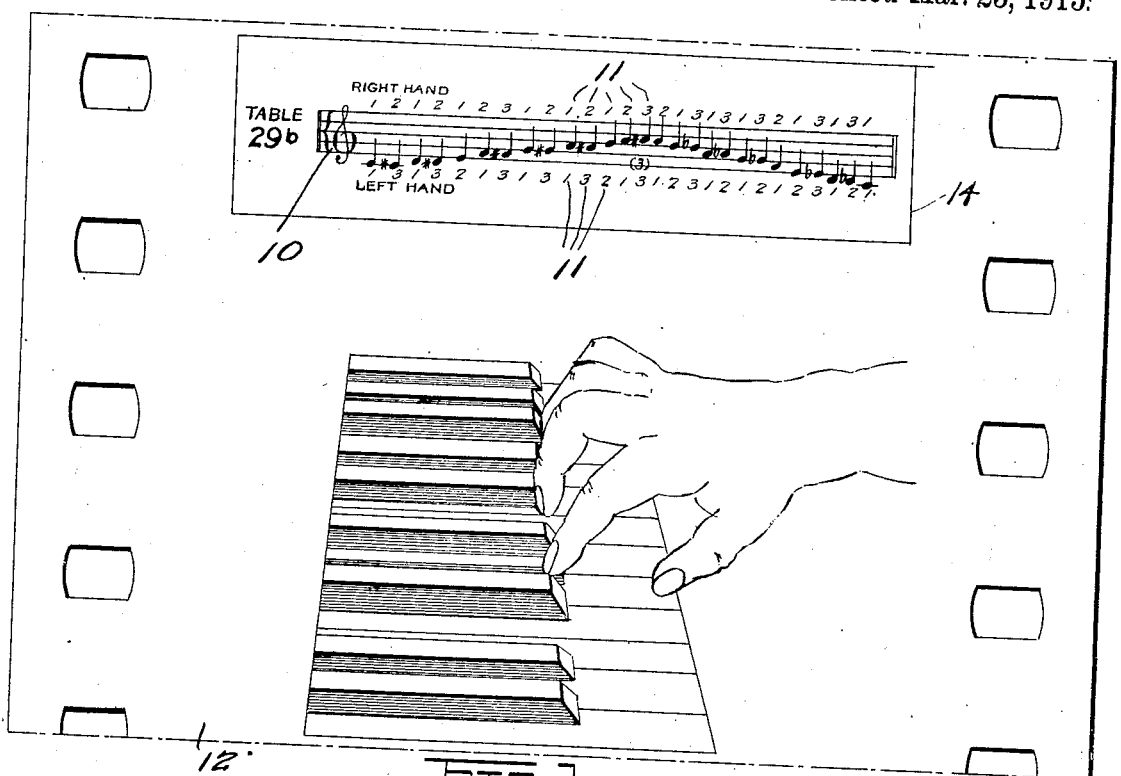
Figures 2, 3, 4:
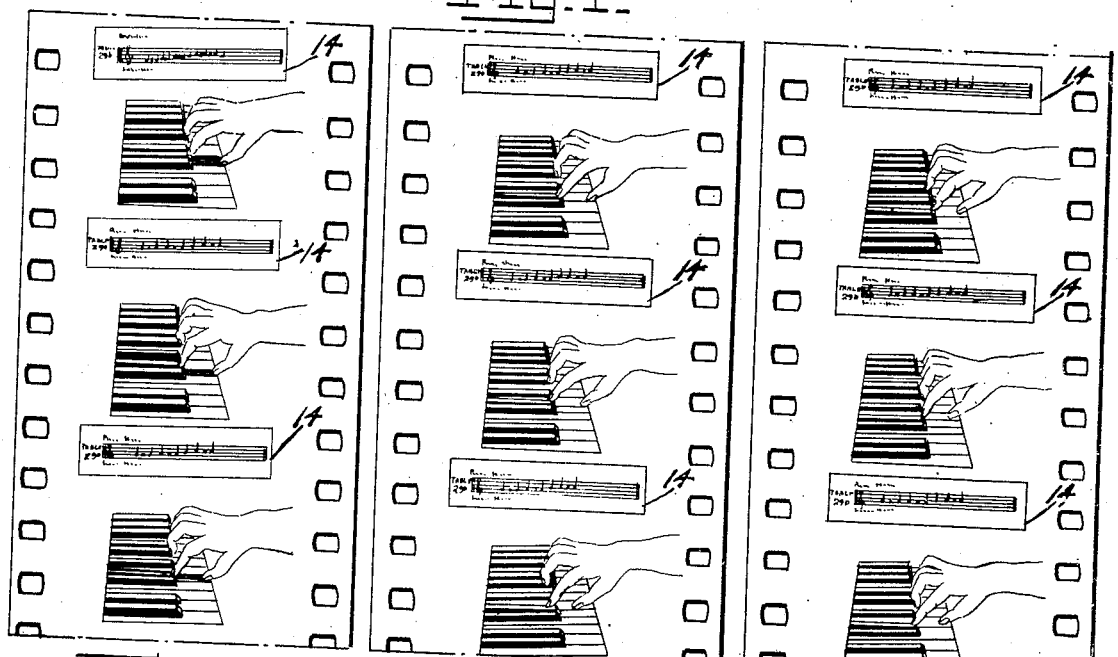

In the drawings—Figure 1 is a view in elevation, on an enlarged scale, of one picture of a motion film, the same delineating the table comprehending the chromatic scale, the indicia for the finger applications, and the hand of the performer in one stage of movement in traversing said scale. Figs. 2 to 4, inclusive are similar views of the film itself, illustrating successive portions thereof for indicating the movements selected for delineating the invention.

In practising the present invention in its simplest form, a series of successive tables outlining in musical notation the different movements is employed. These tables include preparatory exercises for legato; non-legato; wrist and finger staccato; exercises for developing flexibility of the fingers, and the like, and for more advanced playing the tables will include exercises for the chromatic scale; the octave; the triad; the triad arpeggio; the double third; the trill, and similar movements. While the present invention contemplates the depiction of these in musical notation simultaneously with animated pictures illustrating the proper conception of the movements, these tables are accompanied by explanatory notes, in printed form and projected on slides preliminarily to the projection of the various movements by the animated pictures, thus setting forth the significance of the various tables as the latter are projected, and each of these tables bears the proper indicia for the finger applications, whereby to point out to the student the proper fingering in relation to the keys. Hence, as before stated, while it is only deemed necessary to illustrate one of these tables, it will be understood that the invention has in view the utilization of all of the tables in succession which will characterize the particular movements concerning which it is desired to instruct the student.

With the above explanation, and referring in detail to the accompanying drawings, the numeral 10 designates the usual musical staff bearing, as in the instance illustrated, the chromatic scale, and associated with the notes of the scale are suitable designating characters 11 constituting indicia for denoting the application of the several fingers in the playing of the notes. As illustrated, the numeral 1 denotes the application of the thumb; 2 the index finger, and 3 the middle finger, and in those exercises involving the employment of the ring and little fingers the characters 11 would include proper designations therefor.

As before indicated, the proper positions of the fingers and hand to impart the correct conception of the same are outlined by animated pictures, preferably placed upon a film 12, such as is commonly employed in motion picture apparatus, but in projecting these pictures the table relating to the movement which is being portrayed is caused to be displayed with each different position of the figures and hand as at 14, so that while the animated subject-matter indicates by changing positions the different finger and hand movements, the table itself remains unchanged.

In Figs. 2 to 4, inclusive, are illustrated successive portions of the film 12 and indicating the movements of the hand, and the correct positions thereof, when playing that portion of the table including G and G sharp. Manifestly, therefore, reading from the top to the bottom of each of Figs. 2 to 4, inclusive, and considering the subject-matter of these figures in regular succession, it will be seen that the thumb and index finger are first positioned over G and G sharp, the thumb and index finger being then transferred to A and A sharp and then to the keys corresponding in succession, to the successive notes of the table portrayed, appropriate playing of the notes in question occurring during the movements. In traversing the entire table, it will be obvious that the film will depict the various positions of the fingers and hand for the respective notes of the table, thereby imparting to the student a complete conception of these movements, and the accuracy of position which should be assumed.

From the foregoing description it will be seen that the student is not only enabled from the indicia accompanying the tables to obtain the proper finger applications to the respective keys comprehended by the tables, but the portrayal of the finger and hand positions in the various stages of the translation of the tables is also before the student, and in the changing of these positions of the fingers and hand the student receives the correct impression regarding these positions. While the tables may, of course, be projected through the medium of the usual motion picture projecting apparatus, it is also proposed to employ for this purpose a hand instrument which forms the subject-matter of a companion application, filed Dec. 28, 1912, Serial No. 739,135, thus placing at small cost a suitable device within the means of the ordinary piano student.

While the films show the correct positions of the fingers and hand in playing the different movements, they are also made to include depictions of incorrect positions, thereby guarding the student against the common mistakes met in acquiring these movements, which incorrect positions are shown by films indicating the faults.

In connection with the animated pictures audible indication of the proper fullness and sound of the tones may be effected by a suitable instrument operated synchronously with the display of the pictures.

Having thus described the invention, what is claimed as new, and desired to be secured by Letters Patent, is:

1. The hereindescribed art of piano technic instruction, which consists in displaying a musical notation and a given finger movement for the interpretation thereof, maintaining the musical depiction of said movement unchanged during the period of display, and simultaneously displaying with the musical depiction animated translations of the notation corresponding to the given finger movement.

2. The hereindescribed art of piano technic instruction, which consists in photographically projecting a musical notation and a given finger movement for the interpretation thereof, maintaining the musical depiction of said movement unchanged during the period of projection, and simultaneously therewith projecting photographically animated translations of the notation corresponding to the given finger movement.

3. The hereindescribed means for piano technic instruction, comprising a film having a series of pictures of the movement of the hand in executing a musical composition, said film also bearing representations of such musical composition in associated relation with said pictures of the hand movement.

In testimony whereof I affix my signature, in the presence of two witnesses.

MARIE von UNSCHULD-LAZARD.

Witnesses:
Wm. N. Cromwell,
James H. Marr.